United States Patent [19]

Barzuza et al.

[11] Patent Number: 4,915,835
[45] Date of Patent: * Apr. 10, 1990

[54] FLUSHABLE FIBER-FILTER ELEMENT FOR FILTERING A FLUID

[75] Inventors: Ytzhak Barzuza, Petach Tikva; Boaz Lerner, Herzliya, both of Israel

[73] Assignee: Filtration Water Filters for Agri. and Indt. Ltd., Tel Aviv, Israel

[*] Notice: The portion of the term of this patent subsequent to Oct. 14, 2003 has been disclaimed.

[21] Appl. No.: 917,206

[22] Filed: Oct. 9, 1986

Related U.S. Application Data

[60] Division of Ser. No. 788,699, Oct. 21, 1985, Pat. No. 4,617,120, which is a continuation of Ser. No. 478,310, Mar. 24, 1983, abandoned.

[51] Int. Cl.$^4$ .............................................. B01D 29/38
[52] U.S. Cl. ...................... 210/350; 210/357; 210/409; 210/500.1; 55/293; 55/304
[58] Field of Search ............... 210/106, 108, 350, 351, 210/352, 354, 356, 357, 409, 411, 412, 446, 488, 489, 497.3, 505, 500.1; 55/293, 304

[56] References Cited

U.S. PATENT DOCUMENTS

| | | | |
|---|---|---|---|
| 557,075 | 3/1896 | Langer | 210/350 |
| 1,991,847 | 2/1935 | Durgen | 210/500.01 |
| 2,730,242 | 1/1956 | Samuel | 210/354 |
| 2,807,501 | 9/1957 | Richards | 210/409 |
| 3,570,673 | 3/1971 | Butz et al. | 210/500.01 |
| 3,794,179 | 2/1974 | Doucet | 210/409 |
| 3,816,176 | 6/1974 | Rundquist | 210/411 |
| 4,043,918 | 8/1977 | Orona | 210/356 |
| 4,167,482 | 9/1979 | Muller | 210/500.01 |
| 4,219,420 | 8/1980 | Muller | 210/500.01 |
| 4,222,877 | 9/1980 | Silva | 210/500.01 |
| 4,299,699 | 11/1981 | Boogay | 210/411 |
| 4,491,565 | 1/1985 | Verachtert | 422/256 |

FOREIGN PATENT DOCUMENTS

| | | | |
|---|---|---|---|
| 1959867 | 6/1970 | Fed. Rep. of Germany . | |
| 2249603 | 4/1973 | Fed. Rep. of Germany . | |
| 3047967 | 7/1982 | Fed. Rep. of Germany | 210/500.01 |
| 2461513 | 2/1981 | France . | |
| 567463 | 8/1977 | U.S.S.R. | 210/356 |
| 915887 | 3/1982 | U.S.S.R. | 210/357 |
| 1101266 | 5/1982 | U.S.S.R. . | |
| 1200208 | 7/1970 | United Kingdom . | |

Primary Examiner—Richard V. Fisher
Assistant Examiner—Wanda L. Millard
Attorney, Agent, or Firm—Sandler & Greenblum

[57] ABSTRACT

There is provided a filter element for filtering fluids. The element consists of a body member having at least two openings provided, respectively, access and egress for the fluid and a plurality of fibers of a substantially uniform orientation over at least a portion of their active lengths along which portion at least each of the fibers is disposed in close proximity to its adjacent fibers. The invention also provides a flushable filter device incorporating the above described element.

3 Claims, 6 Drawing Sheets

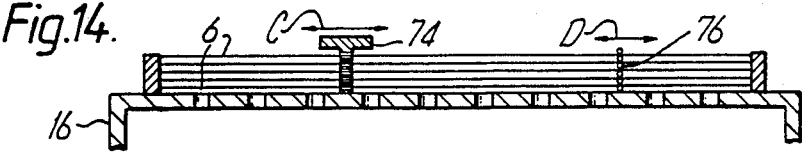
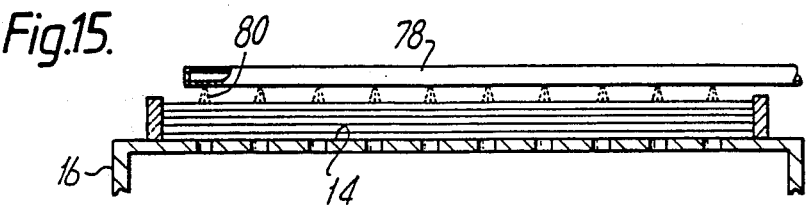
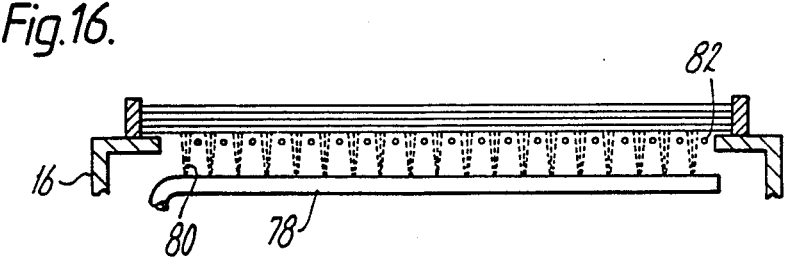
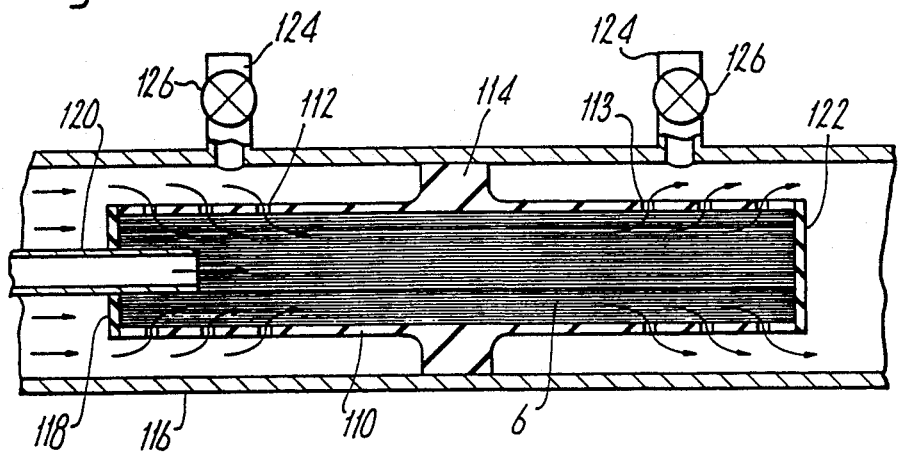

FLUSHABLE FIBER-FILTER ELEMENT FOR FILTERING A FLUID

This is a division of application Ser. No. 788,699, filed Oct. 21, 1985, now U.S. Pat. No. 4,617,120, which is a continuation of Ser. No. 478,310, filed Mar. 24, 1983, now abandoned.

The present invention relates to a filter element for filtering fluids and to a flushable filter device incorporating said element.

A major proportion of all water sources today available require filtration prior to their use, not only for reasons of potability and palatability, but also because solid impurities, even when harmless from the health point of view, are liable to interfere with certain technical uses of water, for instance in agriculture, where aggregating solids such as sand and clay particles or algae are likely to disrupt the operation of, e.g., sprinklers and drip-irrigation devices, the latter being especially susceptible to particulate matter. Filtration devices used range from sand-bed to screen and fiber filters. Sand bed filters, while relatively cheap, are bulky devices requiring frequent monitoring and are not easily cleaned, while screen filters, though much more compact, are costly and, when designed for self-cleaning, rather complex devices, the degree of complexity being reflected in increased failure-proneness. Fiber filters of the mat type, in which fibers are arranged in a three-dimensional random configuration, while having a high separation efficiency and being relatively inexpensive, are hardly usable for flushing applications since solids, once entrapped in the interstices of the filter, are very difficult to flush out again.

It is a first object of the present invention to overcome the drawbacks and disadvantages of the prior-art filters and to provide a novel filter element.

This the invention achieves by providing a filter element for filtering fluids, comprising at least one body member having at least two openings providing, respectively, access and egress for said fluid, and a plurality of fibers of a substantially uniform orientation over at least a portion of their active length, along which portion at least, each of said fibers is disposed in close proximity to its adjacent fibers.

It is a further object of the present invention to provide a fluid filter device that is self-cleaning by a flushing process and is both reliable and inexpensive, using said novel filter element.

In accordance with this aspect of the invention there is provided a filter device for filtering fluids comprising at least one filter element constituted by at least one body member having at least two openings providing, respectively, access and egress for said fluid, and by a plurality of fibers of a substantially uniform orientation over at least a portion of their active length, wherein, in one operational mode of said device, a force is exerted on said fibers, causing said plurality of fibers within said element to closely approach one another, thereby producing a filtering effect and wherein, in another operational mode of said device, said force is relaxed, permitting said fibers to reduce their proximity to one another, thereby facilitating the flushing away of filter deposits.

With specific reference now to the figures in detail, it is stressed that the particulars shown are by way of example and for purposes of illustrative discussion of the preferred embodiments of the present invention only and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIG. 14 is a cross-sectional view illustrating another cleaning method;

FIGS. 15 and 16 illustrate a method of cleaning by liquid jets;

FIG. 19 is a cross-sectional view of another flushable filter element operating in a manner similar to that of the embodiments of FIGS. 17 and 18.

Figure 1:
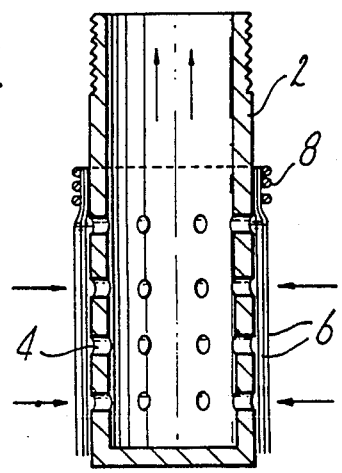
FIG. 1 is a cross-sectional view of a first embodiment of the filter element according to the invention, in which the filter element comprises fibers arranged in the form of a "skirt"

Referring now to the drawings, it should be noted that the filter-element component that carries or accommodates the filter fibers and, in the following is called variously "filter tube", "filter body" or "body member"

is referred to in the appended set of claims as "body member".

There is seen in FIG. 1 a filter tube 2 having perforations 4 along a portion of its length and being closed at its lower end. This perforated portion is covered by a "skirt" of fibers 6 constituting the filter element. These fibers 6 are all of the same orientation, in this case axial, and, in their totality, constitute a substantial layer surrounding the tube 2 Such a layer is advantageously formed by several "sublayers" or "strata" of these fibers 6. It has been found that for the filter to be fully effective, at least three of such strata are required. At its upper end, this layer is firmly attached to the tube 2, for instance, by a length of wire or touch string 8 tightly wrapped around it. The lower ends of the fibers 6 are free.

For larger filter throughputs, a longer tube 2 can be used with several filter elements mounted in succession, with the free ends of each "skirt" at least partly covering the wire-wound portion of the next lower "skirt".

Figure 17:
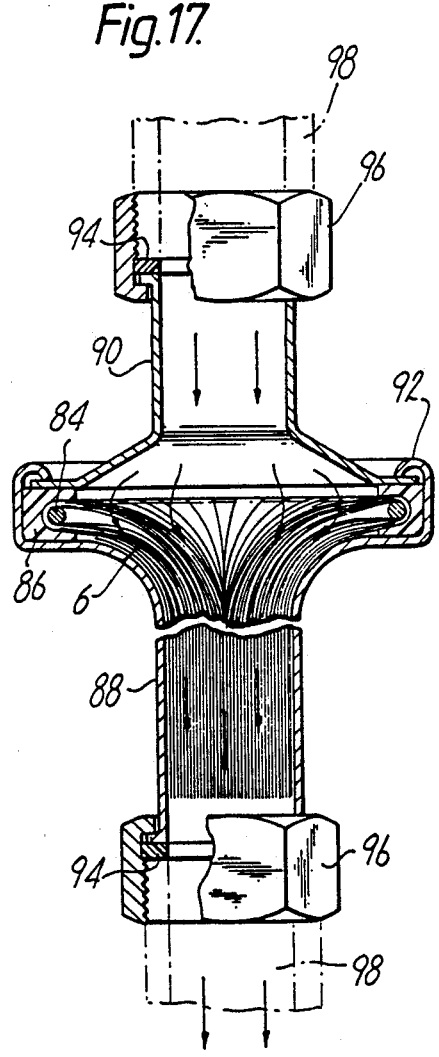
FIG. 17 is a cross-sectional view of a disposable filter element in which the liquid to be filtered flows largely alongside the filter fibers.
Figure 18:
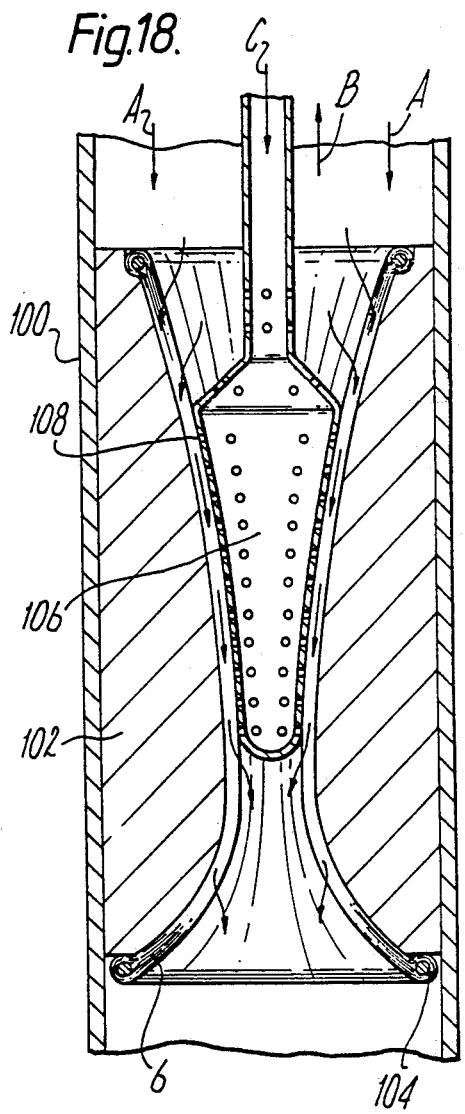
FIG. 18 is a cross-sectional view of a flushable filter element in the form of a sleeve-like fiber layer in which the liquid to be filtered flows largely inside the filter layer, alongside the filter fibers.

The manner in which the element of FIG. 1 is used in a filter device is illustrated in FIGS. 17 and 18, and will be explained further below.

Figure 2:
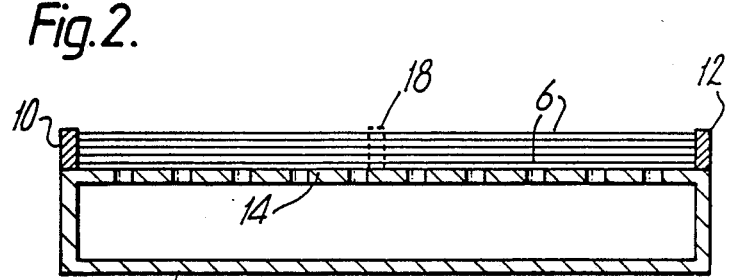
FIG. 2 is a cross-sectional view of another filter element, in which the fibers are arranged in a flat layer.

While in the preceding embodiment, the filter element was, geometrically speaking, more or less tubular, the embodiment shown in FIG. 2 has a flat filter element in the form of a substantially rectangular layer of fibers 6 stretchable between two rails 10, 12 and, in the filtering mode, substantially touching the perforated top surface 14 of the filter body 16 which, in this embodiment is not of a circular, but of a rectangular cross section and is not inside, but below, the filter layer.

Figure 3:
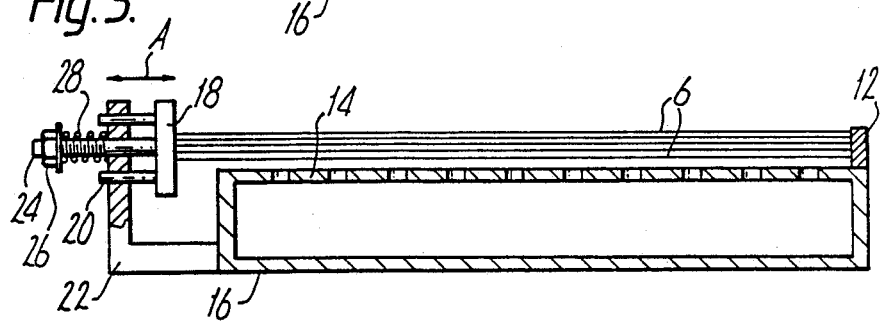
FIG. 3 represents a cross-sectional view of a variant of the filter element of FIG. 2, in which the fibers in the flat layer can be kept tight by a mechanical device.

To function properly, the fibers 6 must be taut. FIG. 3 shows an arrangement whereby such tightening can be carried out. One end of the fibers 6 constituting the filter layer is fixedly attached to the rail 12, which is stationary. The other end is attached to a rail 18 which, guided by pins 20 slidably mounted in a bracket 22, can move in direction of the double arrow A. Also attached to the rail 18 is a bolt 24 having a nut 26 by means of which, against the elastic force of a compression spring 28, the rail 18 can be pulled towards the bracket 22, thus tightening the fibers 6.

Figure 4:
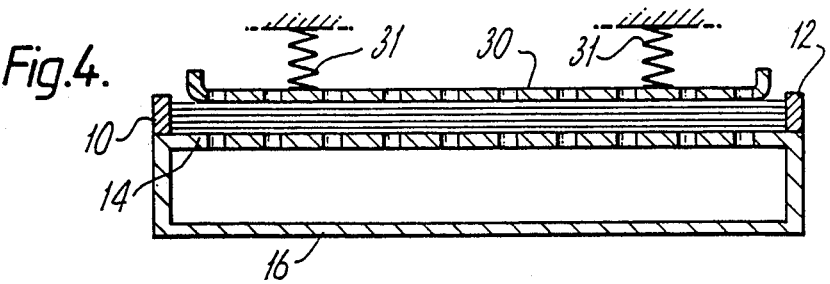
FIG. 4 is a cross-sectional view of another variant of the element of FIG. 2, in which the fibers are pressed against the filter body by means of a spring-loaded top plate.

To keep the fibers 6 close together—a precondition for proper filter action—the embodiment of FIG. 4 is provided with a top plate 30 which, urged by springs 31, presses the filter layer against the top surface 14 of the filter body 16.

Figure 5:
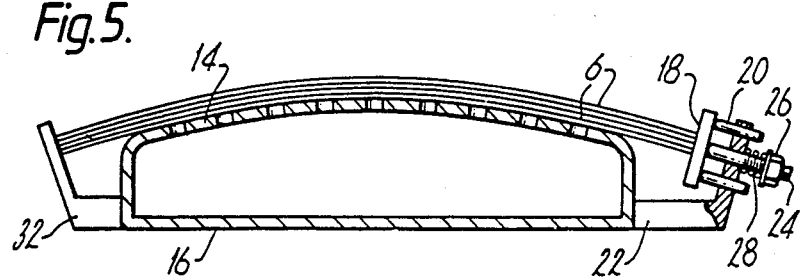
FIG. 5 is a cross-sectional view of yet another variant of the filter element of FIG. 2, in which the filter fibers are kept tight and pressed against the filter body by a mechanical device.

An embodiment that combines the features of the embodiments of FIGS. 3 and 4, i.e., tightens the fibers 6 as well as presses them close together, is seen in FIG. 5. Here the surface 14 of the filter body 16 is convex and the fibers 6 of the filter layer, fixedly attached on one end to a bracket 32, are tightened by the arrangement explained above in connection with FIG. 3. It is clearly seen that, due to the convexity of the top surface 14 of the filter body 16, tightening the fibers 6 will also cause them to be pressed one against the other.

Figure 6:
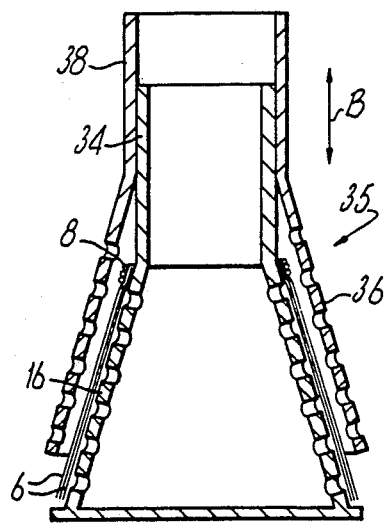
FIG. 6 is a cross-sectional view of a variant of the filter element of FIG. 1, in which the filter body has a conical shape.

The filter elements according to the invention are defined as flushable, i.e., cleanable by application of a flushing liquid. Flushing can be facilitated by relieving whatever tension and/or pressure is exerted on the fibers. In the embodiments of FIGS. 3–5 this is achieved by counteracting, using means as such known and not shown in the drawings, the forces producing tension and/or pressure. Thus, a lever arrangement could be used in the embodiment of FIG. 4 to temporarily lift the top plate 30 against the force of the springs 31 to remove the pressure from the fiber layer. In FIGS. 3 and 5, an eccentric acting on the top of the bolt 24 should have a similar relieving effect that would permit the flushing fluid to reach all fibers The embodiment of FIG. 6 has a conical filter body 16 provided with a cylindrical neck portion 34 and closed at its wider end. The perforated body 16 is covered by a "skirt" of filter fibers 6, the upper ends of which are attached to the body 16 by a length of wire or string 8, as was the case in the embodiment of FIG. 1.

Slidably mounted on th e neck portion 34 of the filter body 16 there is provided a bell-like member 35 having a perforated, conical portion 36 and a cylindrical neck portion 38 slidingly fitting the neck portion of the filter body 16. The conicity of the conical portion 36 equals that of the outside surface of the "skirt" when mounted on the filter body 16. By means not shown, the bell-like member 35 can be moved in directions of the double arrow B. As shown in the drawing, the member 35 is in its lifted position, in which it makes no contact with the "skirt" of fibers 6. This would correspond to the flushing position, in which no pressure is exerted on the fibers For filtering, when the fibers 6 must be close together, the member 35 is moved downwards, making contact with the fibers 6 and providing the required compaction pressure.

Figure 7:
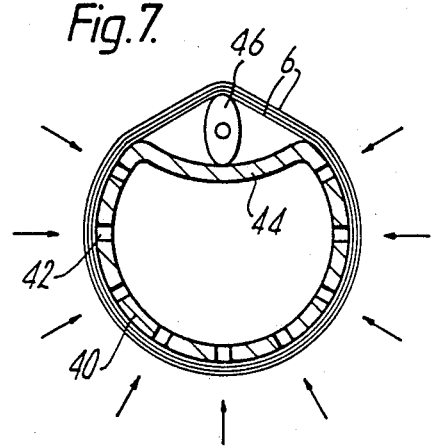
FIGS. 7 and 8 are cross-sectional views of still another embodiment of the filter element in the filtering mode and the flushing mode, respectively.
Figure 8:
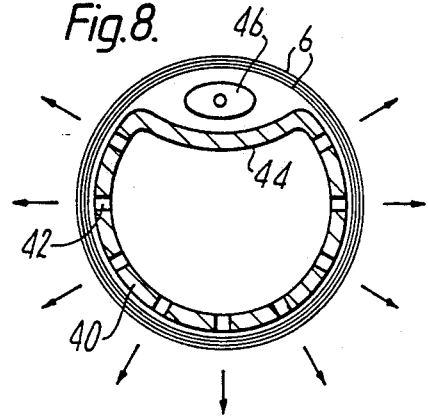

A different embodiment is shown in FIGS. 7 and 8, in which the filter element is in the form of a substantially cylindrical coil obtained by winding the fiber 6 onto a cylindrical winding core, producing several layers. The winding core is then withdrawn and the fiber coil is transferred to a tubular filter core 40 having perforations 42. Except for an inward bulging portion 44, the filter core 40 is cylindrical, but of an outside diameter slightly smaller than the outside diameter of the coil-winding core. Consequently the filter coil will slip over the filter core 40 with clearance, as seen in FIG. 8 However, in order to produce a filtering effect, the fibers 6 have to be taut and close together. FIG. 7, representing the filtering mode, shows how this is achieved: a cam 46 is rotated, thereby progressively tightening the filter coil, until it is tightly pressed against the perforated portion of the filter core 40. For flushing (FIG. 8), this tension must be relaxed which is done by simply rotating the cam 46 to its minimum displacement position, as shown in FIG. 8. Obviously, when preparing the filter coil, the latter must be somehow stabilized to prevent it from spontaneously unwinding as well as from losing its orderly structure. This is best done by applying some adhesive to the ends of the coil while still on the winding core, as well as along at least one generatrix of the cylindrical coil, or along a helix of a pitch equaling the length of the filter coil.

Figure 9:
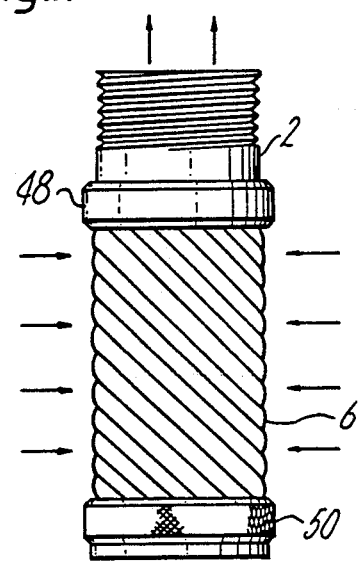
FIG. 9 shows a front view of a variant of the element of FIG. 1 in the filtering mode.
Figure 10:
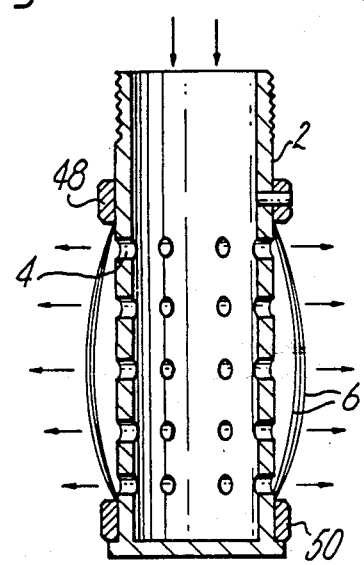
FIG. 10 is a cross-sectional view of the embodiment of FIG. 9 in the flushing mode.

In yet another embodiment (FIGS. 9, 10) a plurality of fibers 6 of equal length is attached on one end to an upper ring 48 and on the other end, to a lower ring 50, the two rings then being slipped onto a filter tube 2. The upper ring 48 is pinned to the tube 2 and is therefore stationary, the lower ring 50 can be rotated. The distance between the rings 48 and 50 is such that when the fibers 6 extend in the axial direction, they are slack, as shown in FIG. 10 which represents the flushing mode of the device. To prepare the device for the filtering mode (FIG. 9), the lower ring 50 is given a twist, which turns the substantially vertical fibers 6 in FIG. 10 into helices tightly pressed against the tube 2 and its perforations 4 Means (not shown) are provided to arrest ring 50 in the twisted position. When released, a twist in the opposite sense will slacken the fibers 6 for the flushing mode.

Figure 11:
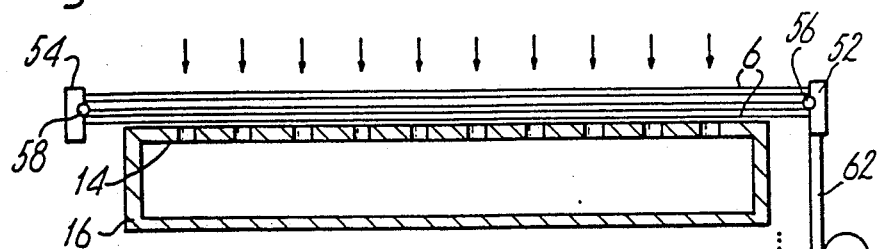
FIG. 11 is a cross-sectional view of a variant of the filter element of FIG. 3, illustrating a method of cleaning of the fiber layer.
Figure 12:
FIG. 12 is a schematic representation to a larger scale, of a detail of FIG. 11.

The embodiment shown in FIGS. 11 and 12, the filter element of which is a flat layer of fibers 6 stretchable between two rails 52 and 54 facilitates flushing by inducing the fibers 6 in differing strata of the filter element to perform a distinct reciprocating movement relative to fibers in other strata. To this end, the rails 52 and 54 are arranged to swivel about the axes 56 and 58, respectively. In the horizontal plane, these axes lay in a plane passing through the center of the filter-element thickness. For instance, if the thickness of the element was made up of 5 layers or strata, this plane would pass through the third layer. In the vertical plane, the axes pass through the plane of attachment of the fibers 6 to the rails 52, 54. A swiveling movement of the rails 52, 54 about the axes 56, 58 respectively would thus turn the rectangular cross section of the filter element as seen in FIGS. 11 and 12 into a rhomboid cross section, as indicated by broken lines in FIG. 12. Such a deformation would entail a relative sliding movement of the different strata or layers. It is such a relative movement that will loosen also sticky solids. The swivel movement required to produce the above effect is obtained, e.g., by an eccentric 60 acting on an arm 62 fixedly attached to the rail 52, against the restoring force of a compression spring 64. The eccentric 60 may be set rotating by a small turbine wheel driven by the mains water.

In addition to the above swivel movement, a certain slackening or relaxation of fiber tension is also provided for during the flushing stage.

Figure 13:
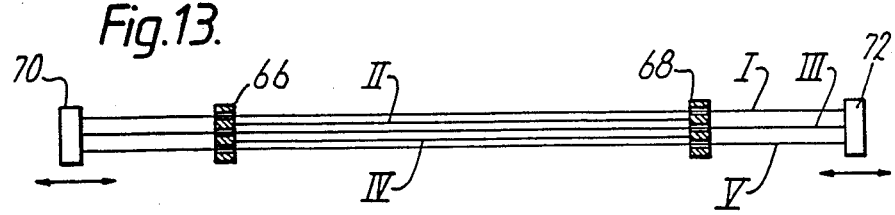
FIG. 13 is a schematic representation of the fiber strata arrangement of a variant of the embodiment of FIG. 11.

In a variant of the embodiment of FIG. 11 represented in FIG. 13, a reciprocating movement of a larger amplitude is obtained by providing two fixed fiber rails 66 and 68, to which are fixedly attached all fibers of strata II and IV, while the fibers of strata I, III and V pass freely through rails 66 and 68, and are fixedly attached to rails 70 and 72. The relative fiber movement is obtained by keeping the rails 66 and 68 stationary, while imparting a reciprocating, in-phase movement to rails 70 and 72. Mechanisms for this purpose are numerous and well-known and are therefore neither explained nor drawn.

FIG. 14 illustrates another cleaning method. Here, the filter fibers 6 are threaded through a comb-like member 74, which, for purpose of cleaning, is imparted a reciprocating motion as indicated by the double arrow C, thereby mechanically scraping off the dirt deposited on the fibers 6. The dirt is then easily removed by flushing. A similar mechanical cleaning effect can be obtained by a number of stretched fibers 76 arranged in a vertical plane including with the filter fibers an angle of about 90°, each cleaning fiber passing between two adjacent strata of the filter fibers 6. When this fiber "comb" is passed from one end of the fiber layer to the other (double arrow D), dirt particles are scraped off.

A preferred way of flushing the filter elements is by application of fluid jets against the filter layer. Seen in FIG. 15 is a flushing tube 78 arranged in proximity of the filter layer, from which tube, in the flushing mode of filter operation, issue a number of jets 80 that, upon impacting the layer, spread it apart locally, flushing out the dirt. To cover the entire filter surface, there must be either a sufficient number of flushing tubes 78, or a relative motion must be introduced between the flushing tube 78 and its jets 80, and the filter surface. The source of the flushing fluid is advantageously, though not necessarily, the fluid to be filtered.

While in the arrangement shown in FIG. 15, the jets 80 impacting the filter layer press the latter against the rigid surface 14 of the filter body 16, which with some types of solids may fail to achieve optimum results, the arrangement shown in FIG. 16, in which the flushing tube 80 is located inside the filter body 16 has its jets 80 impacting the filter layer from below, that is, from the side of its support 82 which, in this case, has either large perforations or is in the form of a mesh-like structure that constitutes only a minimal resistance to the jets 80.

For disposing of particularly clinging filter deposits, it is of course possible to combine several of the above-mentioned cleaning methods, for instance the jet action of the embodiments of FIGS. 15 and 16, and the mechanical agitation produced by the arrangements of FIGS. 11, 13 and 14.

While in the embodiments shown so far the fluid to be filtered passes the fiber layer in a direction substantially perpendicular to the surface thereof, i.e. across the filter layer, it was found that an excellent filtering effect could also be obtained by having the fluid pass inside the layer, along the fibers thereof, that is, inside the "capillary" as it were, formed between each group of three closely packed fibers.

FIG. 17 shows a disposable filter element of this type, which can be used as an in-line filter. There is seen a rigid ring 84 around which are slung a plurality of filter fibers 6. Together with a sealing ring 86, the fibers 6, straddling the ring 84, are then introduced into a lower body member 88, the lower, cylindrical portion of which is completely filled with fibers all having the same, substantially axial, orientation. The upper portion of the lower body member 88 is flared and cupped, to accommodate the sealing ring 86. To this lower member 88 is then tightly attached an upper body member 90 by rolling over the edge 92 of the cupped end of the upper portion of member 88. The ends of the cylindrical portions of both body members, 88 and 90, are flanged, to facilitate liquid-tight connection, via sealing rings 94, and by means of union nuts 96, to the respective ends of the pipeline sections 98. The arrows schematically indicate the fluid flow into, through, and out of the filter element. When the pressure drop across the filter exceeds a predetermined amount, indicating that the filter element was clogged, the union nuts 96 are opened and the entire device replaced. The union nuts 96 could obviously be also part of the pipeline sections 98, in which case the ends of the lower and upper body members, 88 and 90, would have to be provided with threaded sleeves attached to the respective cylindrical portions, e.g , by brazing.

As against the "throwaway" embodiment of FIG. 17, the filter shown in FIG. 18 is flushable.

There is seen in FIG. 18 a length of pipe 100, connectable into a pipeline. A body member 102, preferably axially split, is attached to the inside of the pipe 100 and defines a central hollow space having a venturi-like shape, the wall surface of which space is lined with a sleeve-like filter layer composed of fibers 6 attached with their ends to rings 104. In the filtering position shown, the active, central portion of the filter element is compacted by a hollow, perforated mandril 106 of a shape complementary to that of the fiber lining at this portion, and the fluid entering the filter layer above the mandril 106, as indicated by the arrows, is now compelled to pass through the above-mentioned "capillaries", leaving the layer again below the mandril 106. Flushing of the loaded filter element is initiated by stopping the mainline flow indicated by arrows A, lifting the mandril 106 for a short distance in direction of arrow B, and letting flushing fluid flow into the hollow mandril 106 in direction of arrow C. Due to its substantially conical shape, lifting the mandril 106 will eliminate the force compacting the fibers 6 along the active portion of the layer and will also produce a clearance between the mandril surface and the layer surface The jets produced by the flushing liquid issuing through the perforations 108 will impact the now loosened filter layer and flush out and away all solids To resume filtering, the mandril 106 is again lowered to the position shown in FIG. 18 and mainline flow is restarted, while the flushing flow is stopped. Using means as such known and not further described, these operations are easily automated.

Another flushable filter element is shown in FIG. 19 and has the form of an elongated rubber sleeve 110 provided with inlet-side perforations 112 and outlet-side perforations 113, and with a central collar 114 attachable to the inside wall of the pipeline 116. The sleeve 110 is provided with a first cover lid 118 through which passes a small pipe 120, and a second cover lid 122. The filter fibers 6, filling the entire cross section of the sleeve 110, are attached with their free ends to the two lids 118 and 122. Further provided are two flushing drains 124.

In the filtering position shown, the two drains 124 are closed by schematically indicated valves 126, and the fluid to be filtered flows from left to right as indicated by the arrows. Since the collar 114 prevents the fluid from bypassing the rubber sleeve 110, the fluid is forced to enter the sleeve via the inlet-side perforations 112 and the small pipe 120, whence it passes along the "capillaries" produced by the axially oriented fibers 6, leaVing the sleeve 110 via the outlet-side perforations 113.

Flushing is initiated by opening the two flushing-drain valves 126. This will produce a pressure drop in the annular space surrounding the sleeve 110 on both sides of the collar 114, with the pressure inside the sleeve 110 nearly full, due to the tube 120 which reaches inside the sleeve. The resulting pressure difference WiI1 slightly inflate the resilient rubber sleeve 110, relieving the compaction pressure keeping the fibers 6 tightly together. The fiber bundle is now loosened and the fluid sweeping through it easily cleans the individual fibers of any adhering deposit.

Figure 20:
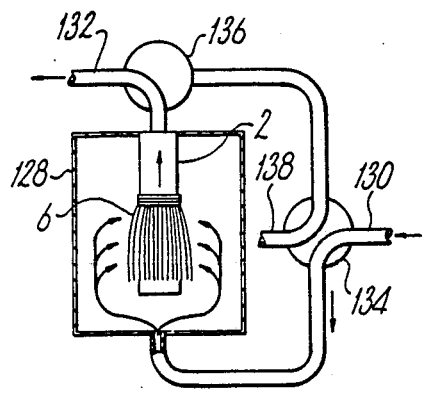
FIGS. 20 and 21 are schematic representations of a filter device according to the invention, in the filtering mode and in the backflushing mode, respectively.
Figure 21:
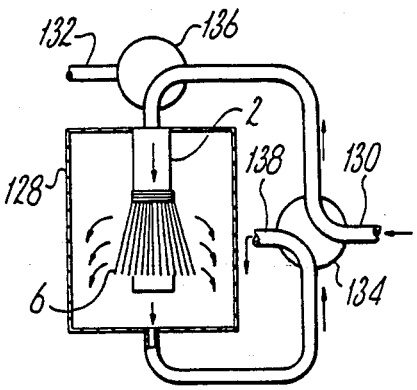

FIGS. 20 and 21 show a filter device according to the invention in the filtering and the flushing mode, respectively. The filter element used in this particular example is the tubular element shown in FIG. 1. The filter tube 2 and the "skirt" and its fiber 6 are seen to be accommodated in a housing 128 provided with a raw-water inlet 130 and a clean-fluid outlet 88. In the filtering mode, (FIG. 20), the raw fluid enters the housing 128 via a first multi-way valve 134 and, due to line pressure, is forced through the skirt of fibers 6 and the perforations 4 (FIG. 1) into the tube 2 and, via a second multi-way valve 32, into the cleanfluid outlet 132. Filtering obviously takes place when the fluid is forced through the fibers 6 which, in this embodiment, partly due to the water pressure acting upon them and partly due to their natural stiffness, form a rather tight layer penetrable by the fluid, but not by solid impurities. These solids are retained in the filter layer. After some time, dependent on the solids load and the filter throughput, the solid residue covering the fibers has to be removed. This is done by switching the multi-way valves 134 and 136 to the positions shown in FIG. 21. The filter now works in the flushing or, in this particular case, backflushing mode. Fluid from the inlet 130 now enters the tube 2 via multi-way valves 134 and 136 and, exiting the tube 2 via the perforations 4 (FIG. 1) impinges upon the fibers 6 from the inside of the "skirt" and spreads the fibers 6 apart, at the same time also flushing away the solids. The flushing fluid including the solids are discharged into the atmosphere or into a drain via the backflush-fluid outlet 138 of the first multi-way valve 134.

Backflushing can be initiated and concluded either manually or automatically. In the latter case, a transducer is provided which monitors the difference between the pressure in the filter housing 128 and that inside the tube 2, in other words, between filter inlet and outlet pressures. When, due to progressive clogging of the fiber layer, this difference exceeds a predetermined limit, backflushing is initiated by switching the valves 134 and 136, as explained above. This switching action can be performed automatically, using appropriate actuators. After a predetermined flushing period, or after pressure difference has returned to normal, the valves 134,136 are again switched and filtering is resumed.

Figure 22:
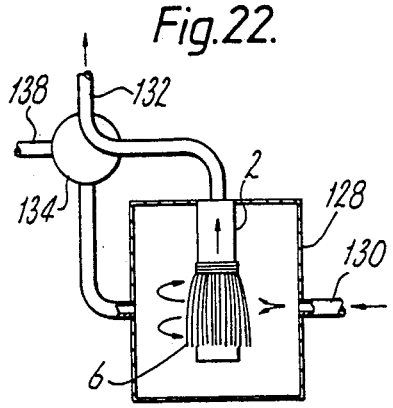
FIGS. 22 and 23 are schematic representations of a filter device according to the invention in the filtering mode and in the impact-flushing mode, respectively.
Figure 23:
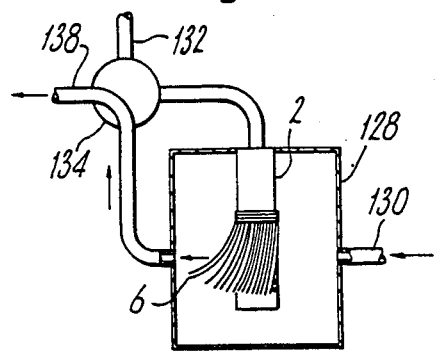

FIGS. 22 and 23 show another filter device according to the invention in the filtering and the flushing mode. This device uses the same element (FIG. 1) as the previous device, but the cleaning effect is produced by impact flushing rather than backflushing. There is provided a housing 128, a raw-fluid inlet 130 and a clean-fluid outlet 132. In the filtering mode (FIG. 22), raw-fluid enters the housing 128 via the inlet 130 and, forced by line pressure through the skirt of fibers 6 and the perforations 4 (FIG. 1) into the tube 2, enters the clean-fluid outlet 132 via a multi-way valve 134.

For flushing, the valve is brought to the position shown in FIG. 23, which causes the clean-fluid outlet 132 to be blocked and the flushing-fluid outlet 138 to be opened. The raw-fluid entering through the inlet 130, now impacts the fibers 6 from all sides, removes the solids and is discharged into the atmosphere or into a drain via the outlet 138.

A substantially tubular filter-body arrangement is also obtainable with any of the above-mentioned flat filter configurations by providing a filter element having a filter body of a polygonal cross section, each face of such a body being covered by a flat filter layer such as those shown in FIGS. 2 to 5 and 11 to 16.

While the fibers of the filter elements according to the invention can be made of any material compatible with the fluid to be filtered, optimum results were obtained for example with twisted synthetic fibers. It has been found that the surface texture imparted to the thread by the twisting operation provided just the right order of magnitude of intenstitial space permitting the fluid to pass without excessive pressure loss, while retaining all solids down to the smallest size which still needs to be filtered out. It is of course also possible to use a single, nontwisted fiber having a texturized surface.

To prevent formation of stagnation zones in the filter layer, it has been found advantageous to provide the top surface of the filter body with a relatively rough texture. This will permit the fluid to get beneath the lowermost fibers of the fiber layer also at regions beneath any two perforations.

While in the aforegoing the filter deposits were explicitly or implicity called solids, this is not necessarily so. With liquids to be filtered, these deposits could well be viscous, or with gases—liquid.

It will be evident to those skilled in the art that the invention is not limited to the details of the foregoing illustrative embodiments and that the present invention may be embodied in other specific forms without departing from the essential attributes thereof, and it is, therefore, desired that the present embodiments be considered in all respects as illustrative and not restrictive, reference being made to the appended claims, rather than to the foregoing description, and all changes which come with the meaning and range of equivalency of the claims are, therefore, intended to be embraced therein.

What is claimed is:

1. A flushable fiber-filter element for filtering a fluid comprising:
    (a) at least one body member having openings providing access and egress for said fluid, and a plurality of fibers, each having an active length;
    (b) said fibers being oriented uniformly in a given direction over at least a portion of their active lengths, along which portion at least, each of said fibers is disposed in close proximity to its adjacent fibers forming a layer;
    (c) said body member having a central bore at least a portion of which is substantially tapering, at least said tapering portion being lined with a sleeve-like layer of said fibers; and
    (d) a hollow-perforated mandril of a shape substantially complementary to said sleevelike layer at said tapering portion and movable in the direction of its longitudinal axis, which mandril in a first position, presses said sleeve-like layer against the wall surface of said bore, and, in a second, axially shifted position removes the pressure from said layer, wherein, in said second position, fluid jets are applied against said layer via said perforations.

2. A filter element according to claim 1, wherein, in its totality, said central bore of said body member defines a hollow space that has a venturi-like shape.

3. A filter element according to claim 1, wherein the fibers constituting said sleeve-like layer are attached with their ends to rings at least the axial position of which is defined by abutment surfaces of said body member.

* * * * *